United States Patent
Powell et al.

(10) Patent No.: US 6,485,404 B1
(45) Date of Patent: Nov. 26, 2002

(54) ADVANCED VITRIFICATION SYSTEM IMPROVEMENTS

(75) Inventors: James R. Powell, Shoreham, NY (US); Morris Reich, Kew Gardens Hills, NY (US)

(73) Assignee: Radioactive Isolation Consortium, LLC, Falls Church, VA (US)

( * ) Notice: Subject to any disclaimer, the term of this patent is extended or adjusted under 35 U.S.C. 154(b) by 0 days.

(21) Appl. No.: 10/063,260

(22) Filed: Apr. 4, 2002

(51) Int. Cl.$^7$ ................................................ B09B 3/00
(52) U.S. Cl. .................. 588/252; 588/11; 588/259; 65/134.8; 65/135.6; 65/136.2; 65/374.15
(58) Field of Search ............................ 588/11, 19, 252, 588/256, 259; 65/134.8, 136.2, 374.15, 135.6

(56) References Cited

U.S. PATENT DOCUMENTS

| | | | |
|---|---|---|---|
| 4,446,563 A | * 5/1984 | Willay ........................ 373/157 |
| 4,943,395 A | * 7/1990 | Sasaki et al. ................. 264/0.5 |
| 5,367,532 A | * 11/1994 | Boen et al. .................. 373/142 |
| 5,678,236 A | * 10/1997 | Macedo et al. .............. 110/345 |
| 5,678,237 A | * 10/1997 | Powell et al. ................ 219/660 |
| 5,843,287 A | * 12/1998 | Wicks et al. ............. 204/157.15 |
| 5,947,887 A | * 9/1999 | White et al. ............... 405/129.2 |
| 6,143,139 A | * 11/2000 | Wicks et al. ............. 204/157.15 |
| 6,211,424 B1 | * 4/2001 | Powell et al. ................ 422/129 |
| 6,283,908 B1 | * 9/2001 | Powell et al. ................ 588/252 |

OTHER PUBLICATIONS

Radioactive Isolation Consortium, LLC (RIC,LLC), "Gate 3 Requirements, Deliverables, and AVS Exploratory Development Proposed Findings", Sep. 1999, downloaded from the internet from URL www.ricllc.com, 16 pages.*

RIC LLC's Report Department of Energy, Contract No. DE–AC26–98FT40450, RIC AVS Exploratory Development Stage, Jan. 24, 2000, downloaded from the internet from URL www.ricllc.com, 7 pages.*

RIC LLC's Development of an Advanced Vitrification System (AVS), Jan. 22, 1999, downloaded from the internet from URL www.ricllc.com, 2 pages.*

RIC LLC's Comments on Waste Treatment Plant, Solicitaiton NO DE–RP27–OORV14136 with Attachment, Aug. 13, 2000, downloaded from the internet from URL www.ricllc.com, 20 pages.*

* cited by examiner

Primary Examiner—J. J. Swann
Assistant Examiner—Katherine Mitchell
(74) Attorney, Agent, or Firm—Louis Ventre, Jr.

(57) ABSTRACT

A process of making vitrified waste in a crucible and inserting the crucible and vitrified waste into an outer container after vitrification. The outer container is then sealed.

6 Claims, 3 Drawing Sheets

US 6,485,404 B1

ADVANCED VITRIFICATION SYSTEM IMPROVEMENTS

BACKGROUND OF THE INVENTION

The Advanced Vitrification System Improvements (AVSI) is an improved method for filling a disposable canister with vitrified waste and glass making frit (hereinafter referred to as "waste") starting with a waste that is cooler than its melting point. The present invention relates generally to a process for vitrifying waste, such as nuclear waste, in a disposable canister.

The disclosure of U.S. Pat. No. 5,678,237, which describes a canister and related method of in-situ vitrification of waste materials in a disposable canister, is incorporated herein by reference. Also the disclosure of U.S. Pat. No. 6,283,908, which describes a method of filling a disposable canister with vitrified waste, is incorporated herein by reference. Referenced U.S. Pat. No. 5,678,237 is for a disposable canister with an inner container, which serves as a crucible, and an outer container. The outer container serves as the traditional disposal container typically made of steel. The outer container is usually insulated from the inner container. The inner container is typically made of graphite.

In referenced U.S. Pat. No. 5,678,237, waste is added to a module comprised of an inner container an outer container and insulation therebetween. An electrified induction coil sends magnetic flux through the outer container and insulation and preferentially heats the inner container, serving as the crucible. By this process, the waste is heated until it is melted. In referenced U.S. Pat. No. 6,283,908, waste is added incrementally and heated zonally. In both of the referenced patents, the waste is then allowed to cool into a solid vitrified product. In both referenced patents, the process involves the pre-assembly of an inner container and an outer container with insulation therebetween. The process of the referenced patents can be simplified and more volume made available for vitrified waste using the AVSI invention described herein.

Accordingly, the AVSI invention is an improvement over the referenced patents.

BRIEF SUMMARY OF THE INVENTION

The AVSI invention improves the method of the referenced patents âe" (1) by vitrifying waste in a crucible while the crucible is separate and apart from the outer container; (2) by eliminating the need to cool the outer container during the vitrification process because the outer container is not subjected to any heating during the vitrification process; and (3) by adding a step which would assemble the canister, that is namely, inserting the crucible, that is, the inner container, into the outer container after the cool-down of the vitrified waste. The AVSI invention improves the disposable canister of the referenced patents by eliminating the insulation between the inner and outer containers and by enlarging the diameter of the crucible to fill the volume within the outer container created by removal of the insulation, so that the disposal canister can contain a larger volume of waste.

BRIEF DESCRIPTION OF THE SEVERAL VIEWS OF THE DRAWINGS

The AVSI invention, in accordance with preferred and exemplary embodiments, together with further objects and advantages thereof, is more particularly described in the following detailed description taken in conjunction with the accompanying drawing in which.

DETAILED DESCRIPTION OF THE INVENTION

Figure 1:
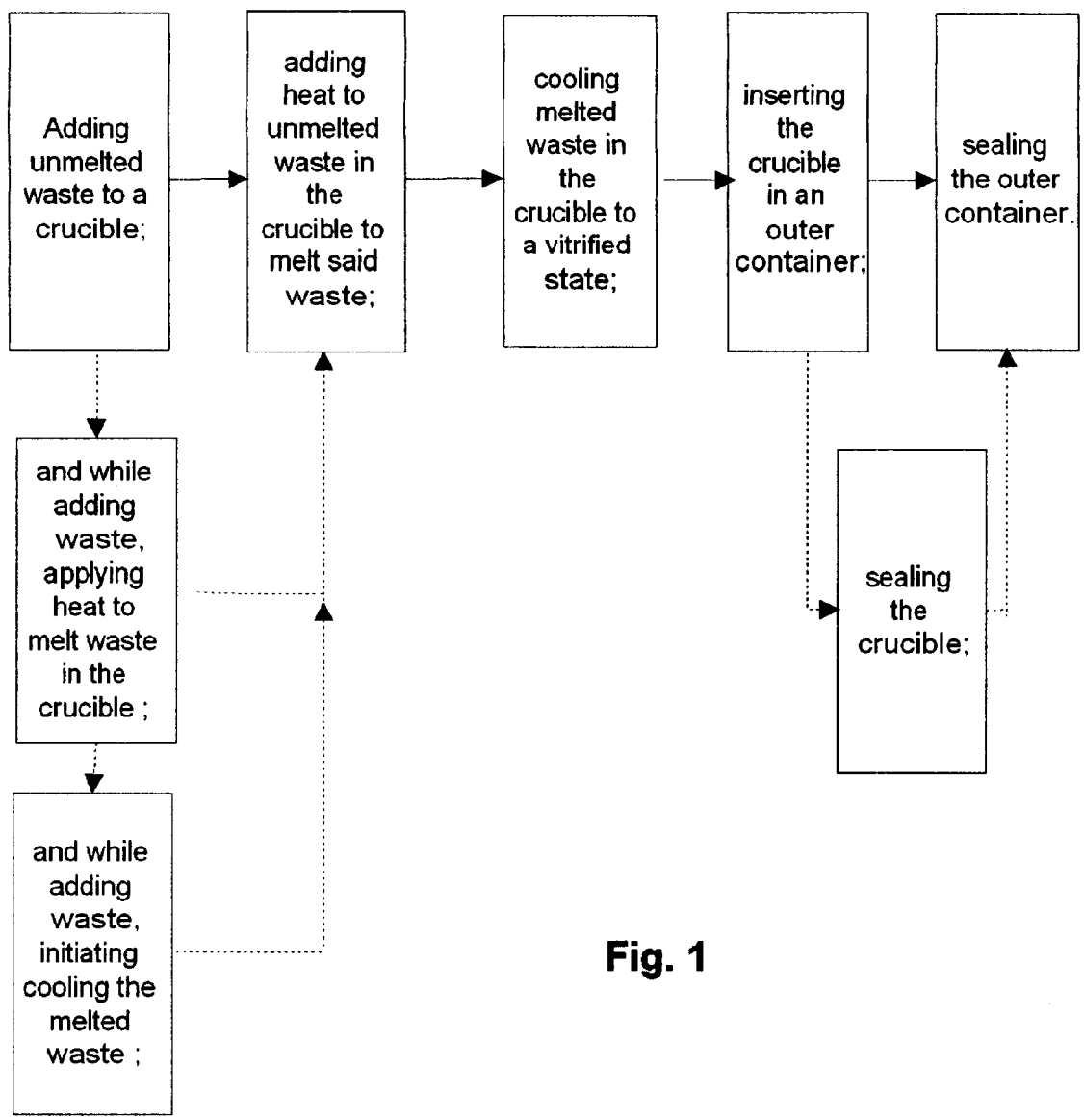
FIG. 1 shows a flow chart of the method of in-situ vitrification.
Figure 2:
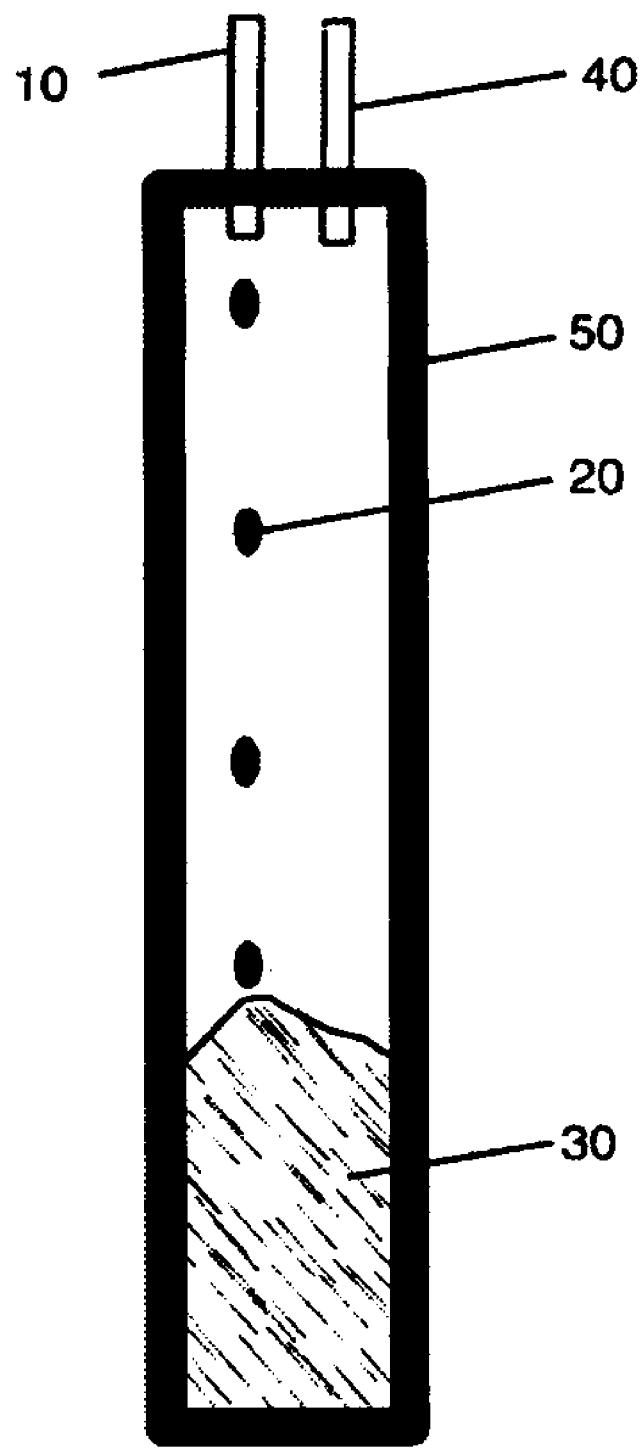
FIG. 2 shows the crucible (50) of a disposable waste canister.
Figure 3:
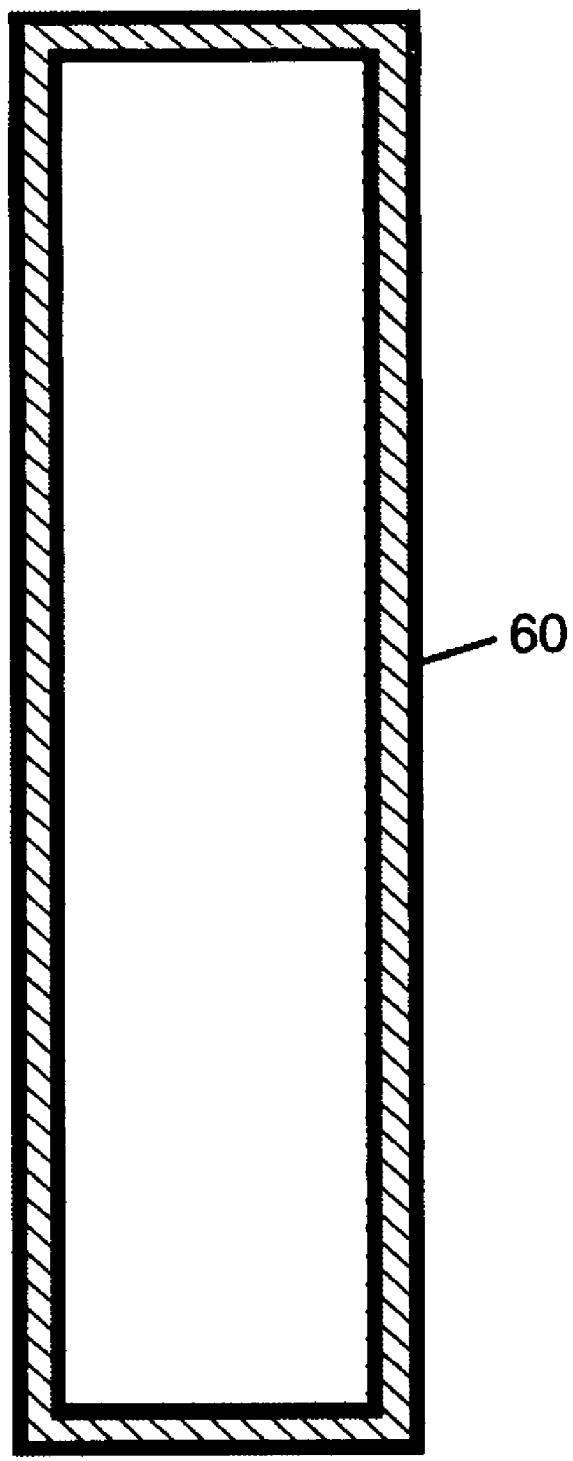
FIG. 3 shows the outer container (60) of a disposable waste canister.

The method of the claimed invention is graphically shown in FIG. 1. The physical shape of the crucible and outer container used in the methods is shown in FIGS. 2 and 3.

FIG. 1 shows the process steps of the invention in boxes reading from left to right, with solid arrows indicating the progression of the steps in the process. Variations of the steps of the invention, which are claimed as dependent claims, are shown in FIG. 1 as process steps connected by dotted arrows.

The invention is a process of making vitrified waste in one container, the crucible, and inserting the crucible into an outer container after vitrification. The outer container is then sealed.

The crucible, shown in FIG. 4 may be made of any material capable of being heated and then cooled such that unmelted waste is first melted, then cooled to produce a vitrified waste in the crucible. The container to which the waste is added is the crucible and is what will later be the inner container of the assembled disposal canister. In the best mode of the invention, the crucible would be made of graphite and lined with alumina or other protective coating. A protective coating, like alumina, protects the crucible material from reaction with the waste and preserves the integrity of the crucible, and thus the inner container within the canister, for containing the vitrified product.

The unmelted waste is typically in a solid, liquid or mixed solid/liquid form. It may or may not contain frit materials and other additives to promote vitrification, which are well known in the art. The waste may be in particle form, solid chunks, liquid slurry or any other form obtainable.

The outer container, shown in FIG. 3, can be any type of container used for the disposal of wastes. The outer container would typically be a standardized disposal container, well known in the art. Containers for high level radioactive waste are typically made of stainless steel.

The boxes across the top row of FIG. 1 depict the process steps wherein a single charge of unmelted waste is added to the crucible.

In the second box or step across the top row of FIG. 1, the waste is heated to raise the temperature of the unmelted waste above its melting point. In accordance with practices well known in the art, this melting may be thorough or may leave unmelted elements as a mixture within the melt pool. Heating may be accomplished by any means, but in the best mode of the invention, heating would be by passing a current through an induction coil surrounding the crucible. In this mode, the walls of the crucible would heat up as a result of the magnetic flux from the activated induction coil and the waste would be melted by conductive, convective, and or radiative heating. Insulation may surround the crucible to prevent heat loss at too fast a pace to be consistent with a leach resistant vitrified product.

In the third box or step across the top row of FIG. 1, melted waste in the crucible is cooled to a vitrified state. In most cases, the removal of the heat source will be sufficient to cool the melted waste to the vitrified state. However, active cooling may be utilized to speed the vitrification process or to change the nature of the vitrified product.

In the fourth box or step across the top row of FIG. 1, the crucible is inserted into an outer container. In practice, the fit of the crucible and outer container may not be perfect and any extra space between the exterior of the crucible and the interior of the outer container could be filled with non-hazardous particle materials, such as particle graphite.

In the fifth box or step across the top row of FIG. 1, the outer container is sealed. Sealing the outer container completes the disposal canister.

A variation of the invention involves sealing the crucible to create a second enclosure or barrier in the canister. Sealing the crucible, then sealing the outer container would provide a doubly sealed package to lengthen the period of isolation of the vitrified product from the disposal facility environment. In the best mode of the invention, graphite plugs would be glued and screwed in place, sealing any openings at the top of crucible, which would have been used for filling the crucible with waste and removing any gases emitted during the melt. Alternatively, if the top used during the filling process were removable, a full diameter closure top could be glued and screwed in place to make the seal.

Sealing the crucible would occur after the melted waste is cooled to a vitrified state. This sealing step is shown row 2 of FIG. 1 as an additional box connected by dotted lines to the third and fourth boxes, that is, it would be a new step between the steps requiring cooling melted waste in the container to a vitrified state and inserting the container in an outer container. This sealing step could also occur at a later point in the process, for example, after the crucible is inserted in the outer container, or at an earlier point before complete cooling of the melted waste. However, these process options are not shown in FIG. 1 as they are obvious variations. The sealed or unsealed container within the outer container is herein termed a "disposal canister."

A second variation of the invention involves starting the melting process while unmelted waste is being added to the container. This variation is shown row 2 of FIG. 1 as an additional box connected by a dotted line to the first step. This additional box is not an additional step, but an additional limitation on the first box or step in the process. There comes a point in the filling and heating process that the container is filled, and at this point, the second step in the process adds heat to melt the remaining unmelted waste. The remaining steps would then complete the process. This second variation has an advantage over the process shown in the first row of FIG. 1 in that it permits the waste to off-gas incrementally as unmelted waste is added.

A third variation of the invention involves initiating cooling of melted waste while waste is being added to the container. This variation is shown in row 3 of FIG. 1 as an additional box connected by a dotted line to the box in row 2 of FIG. 1. As with the prior variation, this additional box is not an additional step, but is a second limitation on the first step in the process. As waste is being added and melted, it is also being cooled to vitrify it. Cooling would only occur once the was sufficient melted waste to begin the vitrification process. Cooling would probably first take place at the bottom of the container, where the waste would have been in a melted state for the longest time. If the container is long enough, the filling and heating process would be ongoing as cooling from the bottom began. When the filling process is completed, the second step in the process would complete the melting process. The remaining steps would then be the completed.

FIG. 2 shows unmelted waste (20) dropping into the crucible from a feed pipe (10). While the waste is being fed or after it is all added to the crucible, the waste (30) is heated, melted and allowed to cool to a vitrified mass. During heating, off-gases from the melt exit the canister through an exhaust pipe (40). Once the waste has cooled, the crucible (50) is sealed and then inserted into the outer container (60). The outer container is then sealed, creating a disposable canister.

Alumina or other protective liners or coatings well known in the art may separate the inner surface of the crucible from the waste. Such liners or coatings may be used to prevent the waste from chemically or otherwise erosively interacting with the crucible.

While there has been described herein what is considered to be the preferred and exemplary embodiment of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A process for vitrifying waste, comprising the steps of:
a. adding unmelted waste to a single wall, disposable crucible; b. adding heat to unmelted waste in the crucible to melt said waste; c. cooling the melted waste to a vitrified state; d. inserting the crucible into an outer container; and, e. sealing the outer container for ultimate disposal of combined containers.

2. The process of claim 1 further comprising the step of sealing the crucible subsequent to the step of cooling the melted waste to a vitrified state.

3. The process of claim 1 wherein the step of adding unmelted waste to a crucible further comprises adding heat to initiate melting of the waste in the crucible while adding unmelted waste.

4. The process of claim 2 wherein the step of adding unmelted waste to a crucible further comprises adding heat to initiate melting of the waste in the crucible while adding unmelted waste.

5. The process of claim 3 wherein the step of adding unmelted waste to a crucible and while adding said unmelted waste adding heat to initiate melting of the waste, further comprises initiating cooling of melted waste to a vitrified state while adding unmelted waste.

6. The process of claim 4 wherein the step of adding unmelted waste to a crucible and while adding said unmelted waste adding heat to initiate melting of the waste, further comprises initiating cooling melted waste to a vitrified state while adding unmelted waste.

* * * * *